Dec. 3, 1968   T. E. ALLEN, JR   3,414,131
DIALYSIS FRAME FOR SPECIMEN CUVETTE
Filed Oct. 4, 1966
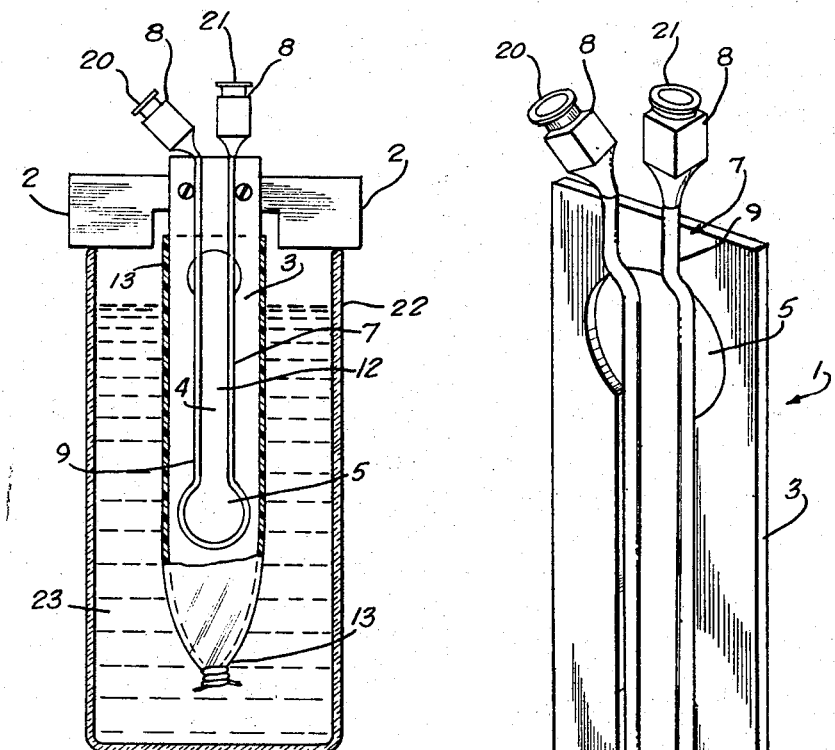
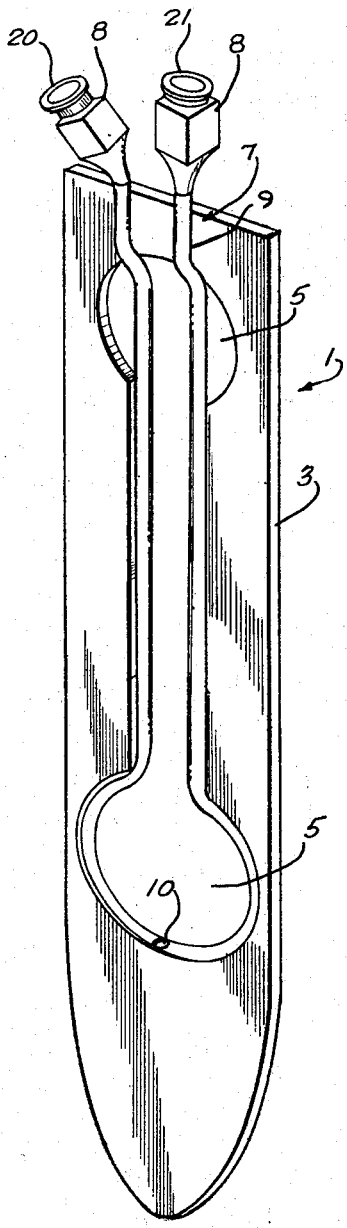
Fig. 1
Fig. 2
INVENTOR.
TURMAN E. ALLEN, Jr.
BY
ATTORNEY United States Patent Office 3,414,131
Patented Dec. 3, 1968

3,414,131
DIALYSIS FRAME FOR SPECIMEN CUVETTE
Turman E. Allen, Jr., Kensington, Md.
(1616 15th St., Meridian, Miss. 39301)
Filed Oct. 4, 1966, Ser. No. 584,283
2 Claims. (Cl. 210—321)

ABSTRACT OF THE DISCLOSURE

This invention comprises a dialysis frame used to form with a standard dialysis membrane tubing a chamber for specimen analysis. The frame is an elongated member having an opening therethrough which forms the chamber when the frame is inserted in the tubing. The frame includes an integral, generally U-shaped, filling and emptying pipe adapted to the configuration of the opening and extending upwardly for external filling and emptying of the chamber. The pipe originates in a syringe coupling, has a chamber filling and emptying hole disposed at the lower end of the chamber, and terminates in an aspirator coupling.

The invention described herein may be manufactured and used by or for the Government for governmental purposes without the payment to me of any royalty thereon.

BACKGROUND OF THE INVENTION

(1) Field of the invention

This invention relates to a dialysis frame for continuous use in successive tests for the determination of erythrocyte osmotic fragility in a continuous recording system.

(2) Description of the prior art

The method and an apparatus for determining red cell osmotic fragility was described by Danon and his associates in articles published in the Journal of Clinical Pathology, volume 16, pages 377–382 (1963), and IEEE Transactions on Bio-Medical Electronics, volume 10, pages 24–28 (1963).

The test is designed to measure the capacity of the red cell membrane to withstand increased internal pressure brought about by the diffusion of water into the cell. As the internal pressure increases hemoglobin from the cells is released into the suspending medium. Information on the osmotic fragility of the red blood cells is useful in the diagnosis of various hemolytic diseases and other blood disorders.

The test consists of establishing an osmotic gradient between the red blood cells and the external medium in which the cells are placed, producing an increasing pressure that drives water into the cells until hemolysis occurs, the bursting of the cell membrane or opening of numerous pores which releases hemoglobin into the surrounding medium. The test is based on the principle that an erythrocyte suspension, when exposed to a constantly decreasing concentration of saline solution, constantly and gradually undergoes hemolysis. This results in an increasing light transmission which can be detected and measured as a function of time.

SUMMARY

This invention relates to a reusable frame used with membrane tubing to form a dialysis test cell. The frame also includes a cell inlet and outlet integral with the frame. A pipe is disposed to conform to the inner wall of the cell with an opening in communication with the cell interior. The pipe is used to dispense a measured amount of either wash solution or sample into the same relative position within the cell for duplication of tests and greater accuracy in determining erythrocyte osmotic fragility.

Accordingly, it is an object of this invention to provide a dialysis frame for use in a red cell osmotic fragility test.

It is another object to provide a reusable specimen cuvette for use with a recording densitometer having an integral adding and emptying network for dialyzing a test suspension of red cells.

It is a further object to provide a dialysis cuvette for adding, dialyzing and emptying a test suspension of red cells having light transmitting ability when used with a recording densitometer, and having the ability of rapid and efficient flushing and cleaning for reuse.

These and other objects will become readily apparent with attention to the drawings and following description wherein:

BRIEF DESCRIPTION OF THE DRAWINGS

FIG. 1 is a front view of the frame of this invention disposed for use as a dialysis chamber; and FIG. 2 is a detail perspective view of the frame of this invention.

DESCRIPTION OF THE PREFERRED EMBODIMENT

The frame 1 comprises supporting and centering arms 2, and a chamber forming member 3. The dialysis chamber 4 is formed by the two connected circular openings 5, in member 3.

The adding and emptying network 7, integral with the frame 1, comprises two external couplings 8, connected by tubing 9. Tubing 9 surrounds the lower portion of chamber 4, and provides for the ingress and egress of test suspensions at hole 10, located at the lowest point of lower circular opening 5. The tubing 9 is connected to the internal wall of chamber 4, and is designed to function as a quick adding, emptying, and wash-out means without altering the thickness of the chamber forming member.

The light transmitting walls 12 of the chamber 4 are formed by conventional transparent dialysis tubing 13. The tubing is wetted and knotted at one end in a conventional manner, and stretched over the forming member 3, thus forming a water-tight chamber 4, or specimen container.

The frame 1 is preferably stainless steel 0.021 inch thick and $9/_{15}$ inch wide. The lower hole 5 is $3/_8$ inch in diameter. Common transparent cellulose dialysis tubing $9/_{32}$ inch in diameter was used.

To assemble the cuvette, the tubing 9 is wetted in a normal saline solution knotted at one end, and stretched over frame 1 as shown in FIG. 1.

A small disposable syringe containing a test red cell suspension is coupled to inlet coupling 20, and the chamber 4 is rinsed three times as the suspension is forced in by the syringe and out by a suction hose attached to the outlet coupling 21.

When the wash is complete, and the chamber empty, the hose is disconnected. The chamber 4 is then filled with a test suspension from the syringe and immediately placed in a test tube 22, containing distilled water 23.

A recording densitometer is then used to record the density of the cell suspension as a function of time, starting from a maximum reading indicating no hemolysis to a minimum reading indicating total hemolysis.

When a continuous plateau of minimal reading is obtained the test is complete and the chamber may be flushed for reuse.

I claim:
1. A dialysis chamber frame for forming with a flexible dialysis membrane tube a specimen cuvette comprising:
    (a) a preshaped rigid form having a greater width than the diameter of the tube, said form having an elon- gated opening therein of a preselected configuration, and a lower rounded end for inserting into the tube;
(b) supporting arms attached to said form at an upper end thereof for suspending said form in a container; and
(c) filling and emptying means, comprising a substantially U-shaped tube with an emptying and filling hole in the bottom portion thereof, carried by said rigid form and communicating through said hole with said opening, at the lower extremity thereof for successive adding and emptying of a specimen liquid suspension into said opening so that when said frame has been inserted into the dialysis membrane tube a reusable dialysis chamber is formed having an external filling and emptying means.

2. The frame of claim 1 wherein the filling and emptying means comprises:
(a) a rigid tube having a diameter no greater than the thickness of the form, said tube having an inlet end, an outlet end, said ends being carried by said form and said tube disposed adjacent the walls of said opening in said form so that said tube is adapted to the configuration of said form opening, the filling and emptying hole in said tube being disposed adjacent the lower extremity of said form opening and opening internally thereto;
(b) a first coupling means attached to the inlet end of said tube for connecting said tube to a syringe;
(c) a second coupling means attached to the outlet end of said tube for attaching said end to a suction hose.

References Cited
UNITED STATES PATENTS 3,300,385   1/1967   Danon _____ 167—84.5

OTHER REFERENCES

Neidle, "The Temperature-Effect in Dialysis and a Simple, Rapid Dialyzer," Journal of The American Chemical Society, vol. 38, 1916, pp. 1270–1272.

REUBEN FRIEDMAN, *Primary Examiner.*